(12) United States Patent
Toft et al.

(10) Patent No.: US 9,056,974 B2
(45) Date of Patent: Jun. 16, 2015

(54) FLUOROPOLYMER MODIFIED ACRYLIC CAPSTOCK

(75) Inventors: Adam Toft, King of Prussia, PA (US); Charles C. Crabb, Royersford, PA (US); Harold Reid Banyay, Bensalem, PA (US); Michael Burchill, Langhorne, PA (US)

(73) Assignee: Arkema France, Colombes (FR)

( * ) Notice: Subject to any disclaimer, the term of this patent is extended or adjusted under 35 U.S.C. 154(b) by 374 days.

(21) Appl. No.: 12/095,221

(22) PCT Filed: Nov. 21, 2006

(86) PCT No.: PCT/US2006/045033
§ 371 (c)(1),
(2), (4) Date: May 28, 2008

(87) PCT Pub. No.: WO2007/064529
PCT Pub. Date: Jun. 7, 2007

(65) Prior Publication Data
US 2008/0293837 A1     Nov. 27, 2008

Related U.S. Application Data

(60) Provisional application No. 60/741,616, filed on Dec. 1, 2005.

(51) Int. Cl.
| | | |
|---|---|---|
| *C08K 3/40* | (2006.01) | |
| *C08L 27/16* | (2006.01) | |
| *C08J 9/22* | (2006.01) | |
| *C08L 33/08* | (2006.01) | |
| *C08L 33/10* | (2006.01) | |
| *C08L 27/12* | (2006.01) | |

(52) U.S. Cl.
CPC ............... *C08L 33/08* (2013.01); *C08L 27/12* (2013.01); *C08L 33/10* (2013.01); *C08L 2205/02* (2013.01)

(58) Field of Classification Search
CPC ....... C08L 33/08; C08L 33/10; C08L 2205/02
USPC ............. 428/195.1, 412, 511, 514; 524/520
See application file for complete search history.

(56) References Cited

U.S. PATENT DOCUMENTS

| | | |
|---|---|---|
| 3,524,906 A | 8/1970 | Schmitt et al. |
| 5,208,083 A | 5/1993 | Freed |
| 5,318,737 A | 6/1994 | Trabert et al. |
| 5,322,899 A | 6/1994 | Grunewalder et al. |
| 6,054,538 A | 4/2000 | Thulliez et al. |
| 6,444,311 B1 | 9/2002 | Friedman et al. |
| 6,759,480 B1 | 7/2004 | Bouilloux et al. |
| 6,852,405 B2 | 2/2005 | Wanat et al. |
| 2005/0000697 A1 | 1/2005 | Simpson et al. |
| 2005/0069710 A1 | 3/2005 | Bonnet et al. |
| 2006/0058460 A1* | 3/2006 | VanRheenen ............... 525/70 |
| 2006/0068131 A1* | 3/2006 | Hanrahan ............... 428/32.11 |
| 2007/0092701 A1* | 4/2007 | Jeng ............................ 428/195.1 |
| 2010/0258162 A1* | 10/2010 | O'Brien et al. ............... 136/251 |

FOREIGN PATENT DOCUMENTS

| | | |
|---|---|---|
| EP | 0476942 | 9/1991 |
| EP | 476942 | 3/1992 |

* cited by examiner

*Primary Examiner* — David W Wu
*Assistant Examiner* — Marie Reddick
(74) *Attorney, Agent, or Firm* — Thomas F. Roland

(57) ABSTRACT

The invention relates to the use of an impact-modified acrylic blend with a low level of fluoropolymer to achieve impact resistance and solvent resistance in a capstock formulation. Preferably the acrylic blend contains a methyl methacrylate-based acrylic polymer and polyvinylidene fluoride.

6 Claims, No Drawings

FLUOROPOLYMER MODIFIED ACRYLIC CAPSTOCK

This application claims benefit, under U.S.C. §119 or §365 of; U.S. 60/741,616, filed Dec. 1, 2005; and PCT/US2006/045033 filed Nov. 21, 2006.

FIELD OF THE INVENTION

The invention relates to the use of an impact-modified acrylic blend with a low level of fluoropolymer to achieve impact resistance and solvent resistance in a capstock formulation. Preferably the acrylic blend contains a methyl methacrylate-based acrylic polymer and polyvinylidene fluoride.

BACKGROUND OF THE INVENTION

Certain structural plastics, such as high impact polystyrene (HIPS), acrylonitrile/butadiene/styrene (ABS) resins, poly (vinyl chloride) (PVC) resins, and the like, exhibit attractive mechanical properties when extruded, molded, or formed into various articles of manufacture. Such articles include, for example, bathtubs, shower stalls, counters, appliance housings and liners, building materials, doors, windows, siding, decking, railings and shutters, lawn and garden applications, marine applications pool application, and storage facilities. Although these structural plastics are strong, tough and relatively inexpensive, the properties of their exposed surfaces are less than ideal. That is, the surfaces of the structural plastics are degraded by light; they can be easily scratched, and can be eroded by common solvents.

Consequently, it has become a practice in the industry to apply another resinous material over the structural plastic to protect the underlying structural material and provide a surface that can withstand abuse associated with the use environment. Such surfacing materials are called "capstocks".

The capstock generally is much thinner than the structural plastic, typically being about 5 to about 25% of the total thickness of the composite comprising the capstock and structural plastic plies. For example, the thickness of the capstock can be about 0.1 to about 2.5 mm, whereas the thickness of the structural plastic ply can be about 1.0 to about 10 mm.

As a class, acrylic polymers, known for their excellent optical characteristics, resistance to degradation by sunlight, hardness, inertness to water and common chemicals, durability, and toughness, are capstocks of choice for various structural plastics. Such acrylic capstocks are described in U.S. Pat. No. 6,852,405, incorporated herein by reference. U.S. Pat. No. 5,318,737 describes the use of an impact modified acrylic capstock for use over PVC by coextrusion.

Fluoropolymers are known for excellent durability and weatherability, however they suffer from poor adhesion to most polymeric substrates. To overcome this deficiency, blends of fluoropolymer and acrylic polymers have been used to produce a good combination of adhesion to thermoplastic substrates, impact resistance, and processing properties. Blends having 30 to 80 percent fluoropolymer have been described in U.S. Pat. Nos. 5,322,899 and 6,444,311.

Surprisingly it has now been found that acrylic capstocks containing low levels of fluoropolymer exhibit excellent impact resistance and solvent resistance in a capstock formulation.

SUMMARY OF THE INVENTION

The invention relates to an impact-modified acrylic composition for use as a capstock, comprising a blend of:

a) 5 to 89 weight percent of acrylic polymer, and
b) 1 to 25 weight percent of fluoropolymer; and
c) 10 to 70 weight percent of one or more impact modifiers.

The invention further relates to a polymer composite comprising a structural polymer having directly adhered thereto an impact-modified acrylic composition capstock, comprising:

a) 5 to 89 weight percent of acrylic polymer, and
b) 1 to 25 weight percent of fluoropolymer; and
c) 10 to 70 weight percent of one or more impact modifiers.

wherein the impact-modified acrylic composition layer has a thickness of from 0.1 to 2.5 mm.

DETAILED DESCRIPTION OF THE INVENTION

The invention relates to the use of an impact-modified acrylic blend with a low level of fluoropolymer to achieve impact resistance and solvent resistance in a capstock formulation.

The acrylic blend contains 5 to 89 weight percent, preferably 30 to 70 weight percent of at least one acrylic polymer or copolymer and 1 to 25 weight percent, preferably 5 to 15 weight percent of at least one fluoropolymer.

By acrylic polymer, as used herein includes homopolymers, copolymers and terpolymers formed from alkyl methacrylate and alkyl acrylate monomers, and mixtures thereof. The alkyl methacrylate monomer is preferably methyl methacrylate, which may make up from 60 to 100 percent of the monomer mixture. 0 to 40 percent of other acrylate and methacrylate monomers may also be present in the monomer mixture. Other methacrylate and acrylate monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers. Alkyl (meth) acrylic acids such as (meth)acrylic acid and acrylic acid can be useful for the monomer mixture. Small levels of multifunctional monomers as crosslinking agents may also be used. Suitable crosslinking monomers include but are not limit limited to, for example, allyl methacrylate, allyl acrylate, divinylbenzene, ethylene glycol dimethacrylate and diacrylate, ethylene glycol triacrylate and trimethacrylate, butylene glycol dimethacrylate, glycidyl methacrylate, triallyl isocyanurate, N-hydroxymethyl acrylamide, N,N-methylene diacrylamide and dimethacrylamide, triallyl citrate, trimethylolpropane triacylate, trimethylolpropane trimethacrylate, and diethyleneglycol divinyl ether. A preferred acrylic polymer is a copolymer of methyl methacrylate and 2-16 percent of one or more $C_{1-4}$ acrylates.

The fluoropolymer blended with the acrylic polymer to form the polymer matrix is a polymer made primarily of fluoromonomers. The term "fluoromonomer" as used according to the invention means a fluorinated and olefinically unsaturated monomer capable of undergoing free radical polymerization reaction. Suitable exemplary fluoromonomers for use according to the invention include, but are not limited to, vinylidene fluoride, vinyl fluoride, trifluoroethylene, tetrafluoroethylene (TFE), and hexafluoropropylene (HFP) and their respective copolymers. The term "fluoropolymer" refers to polymers and copolymers (including polymers having two or more different monomers, including for example terpolymers) containing at least 50 mole percent of fluoromonomer units. A preferred fluoropolymer is polyvinylidene fluoride.

The acrylic matrix includes from 10 to 70 percent by weight, and preferably from 30 to 60 weight percent of one or more impact modifiers. Preferred impact modifiers are core-shell multi-layer polymers and block copolymers having at least one hard and at least one soft block. The core-shell (multi-layer) impact modifiers could have a soft (rubber or elastomer) core and a hard shell, a hard core covered with a soft elastomer-layer, and a hard shell, or other core-shell morphology known in the art. The rubber or elastomer layers are composed of low glass transition (Tg) polymers, including, but not limited to, butyl acrylate (BA), ethylhexyl acrylate (EHA), butadiene (BD), BD/styrene, butylacrylate/styrene, and many other combinations.

In addition to impact modifiers, the impact modified acrylic composition of the invention will contain at least 1 percent, and up to 15 weight percent of other typical additives, such as anti-oxidants, UV absorbers, lubricants, colorants and dyes.

The capstock composition can be applied to a structural plastic in several different ways. For example, preformed sheets or films of the structural plastic and the capstock can be laminated together, as by thermal fusion, by press lamination, or by lamination via an appropriate adhesive or via a mutually compatible polymer interlayer. Adhesion of the capstock layer to the substrate may be improved through the use of a tie layer. The impact grade acrylic flouropolymer blend can be used as a capstock (protective layer) over structural plastics, including, but not limited to ABS, PVC, polycarbonate, polycarbonate/ABS blend, ABS/nylon blend, polycarbonate/nylon blend, glass reinforced polyester thermosets, and other resins to provide good appearance, gloss, surface hardness, and weather resistance to sheet and formed parts. In one embodiment, the structural plastic is polyvinyl chloride (PVC), including wood-polyvinyl chloride composites and foamed PVC. The structural plastic can optionally be impact modified.

It has been observed that gloss reduction, gloss retention, and gloss control can be accomplished by using the acrylic composition of the invention.

Other methods of lamination, such as co-calendaring or bi-extrusion or even solution or dispersion casting, can be used to laminate structural plastics and an acrylic capstock. Alternatively, in appropriate cases, the structural plastic and an acrylic capstock can be co-extruded, and this is often a choice method due to cost and ease of fabrication.

Resin compositions of this invention also can be extruded or injection molded into monolithic sheet, pellets, profiles and film stock using conventional methods well known in the art. The film can then be used in applications such as insert molding.

The impact-modified acrylic blend of the invention provides an ideal balance of impact strength and solvent resistance (such as to isopropyl alcohol), hardness and weatherability. The blend provides for highly weatherable colors—useful in many applications. Such articles include, for example, bathtubs, shower stalls, counters, appliance housings and liners, building materials, such as doors, windows and shutters, decking, siding, railings, and storage facilities.

EXAMPLES

In the following Examples, unless otherwise stated, percent is a weight percent.

Example 1a

The following PMMA compositions contain 49 weight percent polymeric acrylic impact modifier along with between 1 and 3 weight percent of non-polymeric additives. The pre-blended materials were melt compounded by twin screw extrusion at temperatures between 150° C. and 300° C., cooled via a water bath, then pelletized. The pellets were dried overnight in an air circulating oven then injection molded into flat plaques for testing. The plaque samples were tested for impact resistance by an instrumented falling dart procedure following ASTM D 3763 procedure. The results are shown in Table 1.

TABLE 1

| Composition | | | Impact Energy | |
|---|---|---|---|---|
| PMMA Amount | Acrylic Impact Modifier Amount | PVDF Amount | Energy to Max (J) | Total Energy (J) |
| 49% | 49% | 0% (comp) | 11.7 | 15.3 |
| 45% | 49% | 4% | 19.4 | 22.1 |
| 43% | 49% | 6% | 21.1 | 24.1 |
| 41% | 49% | 8% | 23.3 | 26.4 |
| 39% | 49% | 10% | 23.5 | 26.0 |
| 37% | 49% | 12% | 25.3 | 29.4 |
| 29% | 49% | 20% | 28.3 | 34.5 |

Example 1b

The following PMMA compositions contain 47% polymeric acrylic impact modifier along with between 1 and 3% of non-polymeric additives. The pre-blended materials were melt compounded by twin screw extrusion at temperatures between 150° C. and 300° C., cooled via a water bath, then pelletized. The pellets were dried overnight in an air circulating oven then injection molded into flat plaques for testing. The plaque samples were tested for impact resistance by an instrumented falling dart procedure following ASTM D 3763 procedure. Results are shown in Table 2.

TABLE 2

| PMMA Amount | Acrylic Impact Modifier Amount | PVDF Amount | Energy to Max (Ft./Lbs.) | Total Energy (Ft./Lbs.) |
|---|---|---|---|---|
| 51% | 47% | 0% | 6.7 | 7.2 |
| 35% | 47% | 16% | 25.0 | 26.6 |

Example 1c

The following PMMA compositions contain 47% polymeric acrylic impact modifier along with between 1 and 3% of non-polymeric additives. The pre-blended materials were melt compounded by twin screw extrusion at temperatures between 150° C. and 300° C., cooled via a water bath, then pelletized. The pellets were dried overnight in an air circulating oven then injection molded into flat plaques for testing. An Izod notched impact following ASTM D 256 procedure tested the plaque samples for impact resistance. The results are shown in Table 3.

TABLE 3

| PMMA Amount | Acrylic Impact Modifier Amount | PVDF Amount | Izod Impact (Ft. Lbs./In.) |
|---|---|---|---|
| 51% | 47% | 0% | 0.9 |
| 35% | 47% | 16% | 1.5 |

Example 1d

The following PMMA compositions contain 45% polymeric acrylic impact modifier along with between 1 and 3% of non-polymeric additives. The pre-blended materials were melt compounded by twin screw extrusion at temperatures between 150° C. and 300° C., cooled via a water bath, then pelletized. The pellets were dried overnight in an air-circulating oven then coextruded over a poly(vinyl chloride) or PVC plastic substrate to produce a multi-layer sheet for impact testing. The plaque samples were tested for impact resistance by an instrumented falling dart procedure following ASTM D 3763 procedure. The results are shown in Table 4

TABLE 4

| PMMA Amount | Acrylic Impact Modifier Amount | PVDF Amount | Energy to Max (Ft./Lbs.) | Total Energy (Ft./Lbs.) |
|---|---|---|---|---|
| 53% | 45% | 0% | 6.4 | 7.0 |
| 45% | 45% | 8% | 9.9 | 10.6 |

Example 1e

The following PMMA compositions contain 50% polymeric acrylic impact modifier along with between 1 and 3% of non-polymeric additives. The pre-blended materials were melt compounded by twin screw extrusion at temperatures between 150° C. and 300° C., cooled via a water bath, then pelletized. The plaque samples were cut into 1-inch wide specimens then tested for resistance to a 70% isopropyl alcohol solvent via a constant strain procedure. Time for the specimens to craze in minutes was recorded. The average of 10 specimens is recorded below. The test is terminated after 30 minutes with specimens not crazing after 30 minutes classified as NC (no craze). The results are shown in Table 5. Note: a longer time to craze indicates better chemical resistance.

TABLE 5

| PMMA Amount | Acrylic Impact Modifier Amount | PVDF Amount | Avg. Time to Craze: 70% IPA/1/2% Strain |
|---|---|---|---|
| 48% | 50% | 0% | 21 Minutes |
| 40% | 50% | 8% | >30 Minutes all specimens, test terminated |

Example 1f

The following PMMA compositions contain 40% polymeric acrylic impact modifier along with between 1 and 3% of non-polymeric additives. The pre-blended materials were melt compounded by twin screw extrusion at temperatures between 150° C. and 300° C., cooled via a water bath, then pelletized. The plaque samples were cut into 1-inch wide specimens then tested for resistance to a 70% isopropyl alcohol solvent via a constant strain procedure. Time for the specimens to craze in minutes was recorded. The average of 10 specimens is recorded below. The test is terminated after 30 minutes with specimens not crazing after 30 minutes classified as NC (no craze). Note: a longer time to craze indicates better chemical resistance.

TABLE 6

| PMMA Amount | Acrylic Impact Modifier Amount | PVDF Amount | Avg. Time to Craze: 70% IPA/1/2% Strain |
|---|---|---|---|
| 58% | 40% | 0% | 5 Minutes, no specimens exceeding 15 |
| 50% | 40% | 8% | >7 Minutes, one specimen exceeding 30 (NC) |

Example 2

The following PMMA compositions contain 49 weight percent polymeric acrylic impact modifier along with between 1 and 3 weight percent of non-polymeric additives. The pre-blended materials were melt compounded by twin screw extrusion at temperatures between 150° C. and 300° C., cooled via a water bath, then pelletized. The pellets were dried overnight in an air circulating oven then injection molded into flat plaques for testing. The plaque samples were tested for solvent resistance by measuring gloss as molded and then exposing to 70% IPA for 30 Minutes. The results are shown in Table 7. A higher percentage of specular gloss after solvent exposure indicates better chemical resistance.

TABLE 7

| Composition | | | |
|---|---|---|---|
| PMMA Amount | Acrylic Impact Modifier Amount | PVDF Amount | 75 Degree Gloss % Retention |
| 49% | 49% | 0% (comp) | 11.3% |
| 45% | 49% | 4% | 17.6% |
| 43% | 49% | 6% | 25.7% |
| 41% | 49% | 8% | 36.5% |
| 39% | 49% | 10% | 45.6% |
| 37% | 49% | 12% | 49.8% |
| 29% | 49% | 20% | 67.0% |

What is claimed is:

1. An impact-modified acrylic composition consisting of a blend of:
   a) 30 to 70 weight percent of one or more acrylic copolymer(s) consisting of methyl methacrylate units and 2-16 weight percent of one or more $C_{1-4}$ alkyl acrylate monomer units, the weight percent based on the total of all acrylic monomer units in the acrylic copolymer,
   b) 16-25 weight percent of fluoropolymer;
   c) 30 to 70 weight percent of one or more polymeric core-shell impact modifier(s)
   wherein the weight percent of a), h), and c) is based on the weight of the impact-modified acrylic composition, and
   d) 1.0 to 15 weight percent of one or more additive(s) selected from the group consisting of anti-oxidants, UV absorbers, lubricants, colorants and dyes, the weight percent based on the total weight of the impact-modified acrylic composition,
   wherein said composition is a capstock,
   the total acrylic composition adding to 100 weight %.

2. The impact-modified acrylic composition of claim 1, wherein said fluoropolymer is polyvinylidene fluoride.

3. A polymer composite comprising a structural polymer having directly adhered thereto an impact-modified acrylic composition capstock layer, consisting of a blend of:
   a) 30 to 70 weight percent of one or more acrylic copolymer(s) consisting of methyl methacrylate units and 2-16 weight percent of one or more $C_{1-4}$ acrylate monomer units, the weight percent based on the total of all acrylic monomer units in the acrylic copolymer, and
b) 16-25 weight percent of fluoropolymer; and
c) 30 to 70 weight percent of one or more polymeric core-shell impact modifiers,
wherein the weight percent of a), b), and c) is based on the total weight of the impact-modified acrylic composition, and
d) 1.0 to 15 weight percent of one or more additives selected from the group consisting of anti-oxidants, UV absorbers, lubricants, colorants and dyes, the weight percent based on the total weight of the impact-modified acrylic composition,
wherein the impact-modified acrylic composition capstock layer has a thickness of from 0.1 to 2.5 mm,
the total composition adding to 100 weight percent.

4. The polymer composite of claim 3, wherein said structural polymer comprises acrylonitrile/butadiene/styrene (ABS) copolymer, polyvinyl chloride, polycarbonate, polycarbonate/ABS blend, ABS/nylon blend, glass reinforced polyester thermosets, or a polycarbonate/nylon blend.

5. The polymer composite of claim 4 wherein said polyvinyl chloride structural polymer is selected from the group consisting of a non-foamed polyvinyl chloride, a chlorinated polyvinyl chloride, a foamed polyvinyl chloride, an impact modified polyvinyl chloride, and a wood-polyvinyl chloride composite.

6. A method of retaining and controlling gloss and improving solvent resistance in an impact-modified acrylic composition comprising adding from 16-25 weight percent, based on the weight of the acrylic composition, of one or more fluoropolymers to the acrylic composition; wherein said acrylic composition consists of 30 to 70 weight percent of one or more acrylic copolymer(s), 30 to 70 weight percent of one or more polymeric core-shell impact modifier(s), and 1.0 to 15 weight percent of one or more additives selected from the group consisting of anti-oxidants, UV absorbers, lubricants, colorants and dyes, the weight percent based on total weight of the impact-modified acrylic composition, the total of said acrylic composition adding to 100 weight percent; wherein said acrylic copolymer consists of methyl methacrylate monomer units and 2-16 weight percent of one or more $C_{1-4}$ acrylate monomer units, the weight percent based on the total of all acrylic monomer units in the acrylic copolymer.

* * * * *